US012747151B2

(12) United States Patent
Soncini et al.

(10) Patent No.: US 12,747,151 B2
(45) Date of Patent: Sep. 29, 2026

(54) INSPECTION SYSTEM FOR AN ARTICLE TREATMENT MACHINE AND ARTICLE TREATMENT MACHINE HAVING AN INSPECTION SYSTEM

(71) Applicant: SIDEL PARTICIPATIONS, Octeville-sur-Mer (FR)

(72) Inventors: Michele Soncini, Parma (IT); Filippo Dazzi, Parma (IT)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 18/249,024

(22) PCT Filed: Oct. 7, 2021

(86) PCT No.: PCT/EP2021/077663
§ 371 (c)(1),
(2) Date: Apr. 13, 2023

(87) PCT Pub. No.: WO2022/096216
PCT Pub. Date: May 12, 2022

(65) Prior Publication Data

US 2023/0322539 A1 Oct. 12, 2023

(30) Foreign Application Priority Data

Nov. 6, 2020 (EP) .................................... 20206189

(51) Int. Cl.
*B67C 3/00* (2006.01)
*B67C 3/22* (2006.01)
(Continued)

(52) U.S. Cl.
CPC ................ *B67C 3/007* (2013.01); *B67C 3/22* (2013.01); *B67C 7/004* (2013.01); *B67C 7/0073* (2013.01);
(Continued)

(58) Field of Classification Search
CPC ......... B67C 7/0073; B67C 7/004; B67C 3/22; B67C 3/007; B67C 2003/227; B67C 2007/006; B67C 2007/0066
See application file for complete search history.

(56) References Cited

U.S. PATENT DOCUMENTS

2006/0283145 A1 12/2006 Weisgerber et al.
2018/0288372 A1* 10/2018 Kirzinger ................ B67C 3/007
2020/0238591 A1 7/2020 Thomas et al.

FOREIGN PATENT DOCUMENTS

KR 20160128603 A * 11/2016 ......... G01N 21/9009

OTHER PUBLICATIONS

Park, Machine Translation of KR 20160128603 A, Nov. 2016 (Year: 2024).*

(Continued)

*Primary Examiner* — Veronica Martin

(57) ABSTRACT

Provided is an inspection system for an article treatment machine for the packaging of pourable food products and having an isolation chamber delimiting an inner environment from an outer environment. The inspection system includes at least a separation housing mounted to the isolation chamber protruding into the inner environment. The separation housing includes a cavity fluidically separated from the inner environment. The inspection system further includes a camera at least partially arranged within the cavity.

8 Claims, 6 Drawing Sheets

(51) Int. Cl.

| | |
|---|---|
| ***B67C 7/00*** | (2006.01) |
| ***H04N 23/51*** | (2023.01) |
| ***H04N 23/695*** | (2023.01) |

(52) U.S. Cl.

CPC ........... *H04N 23/51* (2023.01); *H04N 23/695* (2023.01); *B67C 2003/227* (2013.01); *B67C 2007/006* (2013.01); *B67C 2007/0066* (2013.01)

(56) References Cited

OTHER PUBLICATIONS

International search report dated Jan. 10, 2022.
Cognex : "IN-SIGHT 2000 Vision Sensors", Apr. 22, 2021, XP055798034, retrieved from the internet : URL:https://esmvision.eu/cognex/wp-content/uploads/2018/09/Vision-Sensors-Product-Guide.pdf (retrieved on Apr. 22, 2021) pp. 6, 14-15.

* cited by examiner

INSPECTION SYSTEM FOR AN ARTICLE TREATMENT MACHINE AND ARTICLE TREATMENT MACHINE HAVING AN INSPECTION SYSTEM

TECHNICAL FIELD

The present invention relates to an inspection system for an article treatment machine for the packaging of pourable food products, in particular the inspection system being for the inspection of an inner environment of the article treatment machine.

Advantageously, the present invention further relates to an article treatment machine for the packaging of pourable food products having an inspection system for inspection of an inner environment of the article treatment machine.

BACKGROUND ART

Pourable food products are known to be packaged into receptacles such as bottles within automatic article treatment machines, the receptacles being closed by means of respective closures after the packaging of the pourable food product within the receptacle.

Such article treatment machines comprise at least an isolation chamber separating an inner environment from an outer environment and one or more treatment apparatuses needed to package the pourable within the inner environment while the inner environment is kept under a controlled condition.

Typical known treatment apparatuses are e.g. filling apparatuses for filling the receptacles with the pourable food product, capping apparatuses for applying closures onto the filled receptacles, conveying apparatuses for conveying the receptacles or closures to be applied onto the receptacles, sterilization apparatuses for the sterilization of the receptacles or closures, blow molding apparatuses for the molding of receptacles from preforms and others.

Often it is necessary to monitor by visual inspection and/or by means of sensors associated to the varying treatment apparatuses the packaging process. This may include the inspection of the function of the treatment apparatuses and/or the receptacles and/or the closures. Visual inspection may e.g. occur by an operator inspecting the inner environment and the packaging process through an inspection window. Sensors may e.g. be adapted to detect defects of the receptacles or other possible problems associated to the filling process and may be associated to components of the treatment apparatuses and may be present in a significant number.

An inconvenience is seen in that the visual inspection is not possible for all areas within the inner environment.

Another inconvenience is considered in that the use of sensors results in an increase in the complexity of the operation of the article treatment apparatus, which becomes more and more significant the more sensors are required.

Thus, a desire is felt in the sector to provide means, which may allow to improve the known article treatment apparatuses.

DISCLOSURE OF INVENTION

It is therefore an object of the present invention to provide means to overcome, in a straightforward and low-cost manner, at least one of the aforementioned drawbacks.

In particular, it is therefore an object of the present invention to provide means so as to inspect areas of article treatment machines for the packaging of pourable food products, which are difficult to inspect.

KR20160128603A discloses an apparatus to inspect a bottle filling solution, which effectively inspects foreign substances mixed in a filling solution using a centrifugal force. US2006283145A1 discloses a beverage bottling plant for filling bottles with a liquid beverage material, having an inspection apparatus for inspecting bottles.

Advantageously, it is also an object of the present invention to provide an article treatment machine for the packaging of pourable food products to overcome, in a straightforward and low-cost manner, at least one of the aforementioned drawbacks.

According to the present invention, there is provided an article treatment machine as claimed in claim 1.

Preferred non-limiting embodiments are claimed in the claims being directly or indirectly dependent on claim 1.

BRIEF DESCRIPTION OF THE DRAWINGS

A non-limiting embodiment of the present invention will be described by way of example with reference to the accompanying drawings, in which.

BEST MODES FOR CARRYING OUT THE INVENTION

Figure 1:
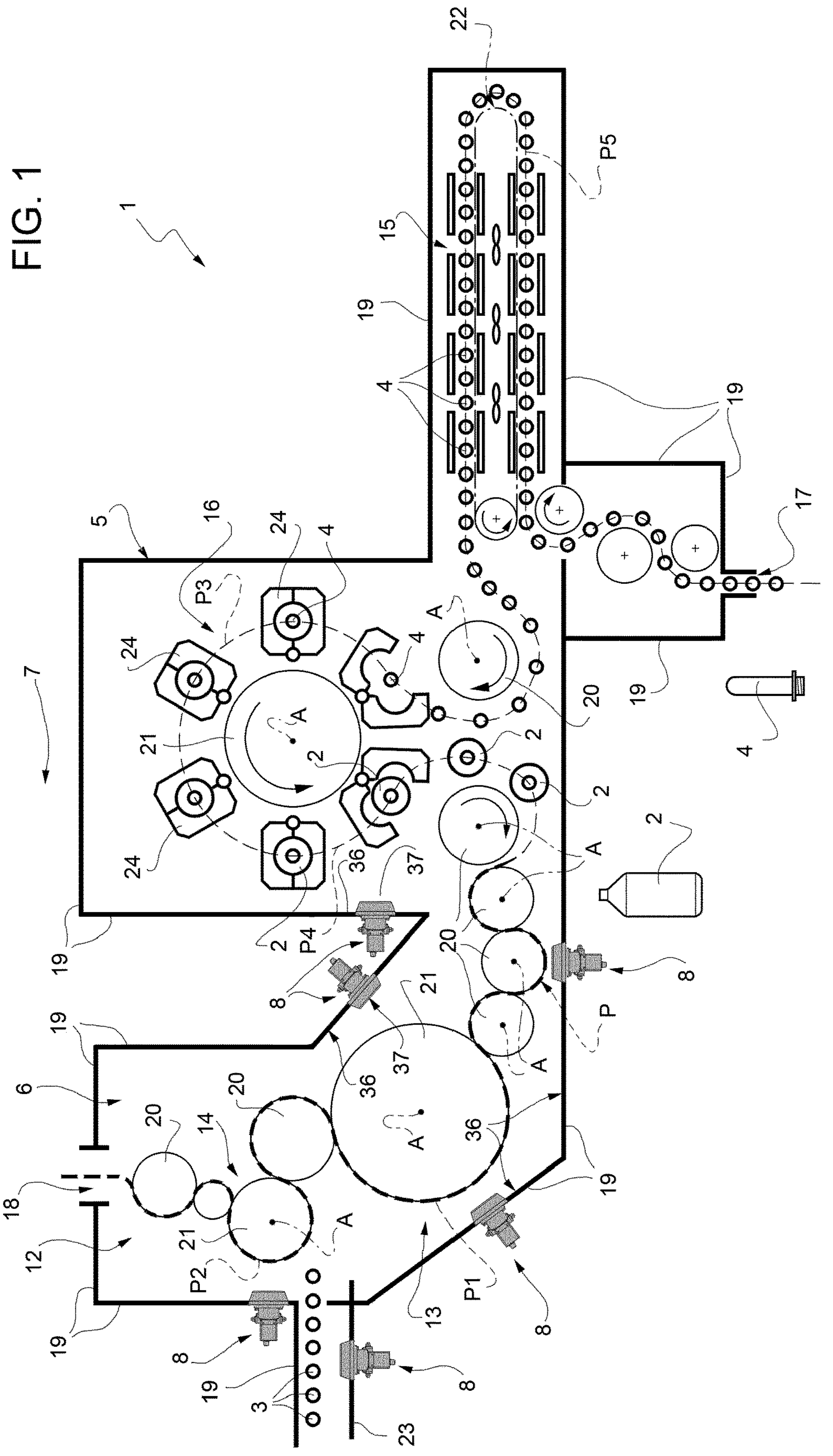
FIG. 1 is a schematic top view of an article treatment machine having at least one inspection system according to the present invention, with parts removed for clarity.

Number 1 in FIG. 1 indicates as a whole an article treatment machine, in particular an automatic article treatment machine, for the packaging of pourable food products, such as carbonated liquids (e.g. sparkling water, soft drinks and beer), non-carbonated liquids (including still water, juices, teas, sport drinks, wine, milk, etc.), emulsions and beverages containing pulps.

In particular, article treatment machine 1 may be configured to treat articles such as:

- receptacles 2, e.g. bottles, jars, vessels, containers or the like, in particular being made of base components, like glass, paper or cardboard, plastics, aluminum, steel, and composites; and/or
- closures 3, e.g. crown corks, screw caps, sports caps, stoppers or similar, in particular produced from a variety of materials such as plastics and metal; and/or
- precursors 4, e.g. preforms, from which receptacles 2 are formed.

In more detail, article treatment machine 1 may comprise:

- an isolation chamber 5 separating an inner (sterile and/or aseptic and/or clean and/or ultraclean) environment 6 from an outer environment 7; and
- one or more treatment apparatuses configured to execute specific treatment steps on the articles within inner environment 6.

Advantageously, article treatment machine 1 also comprises one or more inspection systems 8 configured to inspect areas within inner environment 6 (e.g. portions of the treatment apparatuses and/or the articles (receptacles 2 and/or closures 3 and/or precursors 4)).

In particular, each inspection system 8 may be designed to inspect critical and/or difficult to reach areas within inner environment 6.

According to some possible non-limiting embodiments, inspection systems 8 could be configured to monitor one or more of the following: advancement of the articles, a filling process (i.e. the filling of receptacles 2 with the pourable product), a capping process (i.e. the application of closures 3 onto receptacles 2), a transfer process of the articles from a first portion of one treatment apparatus to a second portion of the treatment apparatus, a transfer process of the articles from one treatment apparatus to another treatment apparatus, transfer and/or advancement of filled receptacles 2 and the possible occurrence of a splashing of the pourable product from receptacles 2 and others.

In more detail and with particular reference to FIG. 1, article treatment machine 1 may comprise one or more of the following treatment apparatuses:

- a conveying apparatus 12 configured to advance (a succession of) receptacles 2 along an advancement path P within inner environment 6 and/or isolation chamber 4; and/or
- a filling apparatus 13 at least partially arranged within inner environment 6 and configured to fill receptacles 2 with the pourable product during their advancement along at least a filling portion P1 of advancement path P; and/or
- a capping apparatus 14 at least partially arranged within inner environment 6 and configured to apply closures 3 onto receptacles 2 during their advancement along at least a capping portion P2 of advancement path P, in particular capping portion P2 being arranged downstream of filling portion P1 along advancement path P.

Furthermore, article treatment machine 1 may comprise a conditioning unit configured to control an ambient condition, such as temperature and/or humidity and/or sterility and/or cleanliness and/or an airflow (direction), within inner environment 6.

According to some possible non-limiting embodiments, article treatment machine 1 may also comprise one or more of additional treatment apparatuses such as:

- a pre-heating oven 15 at least partially arranged within isolation chamber 5 and configured to pre-heat precursors 4 within isolation chamber 5; and/or
- a molding apparatus 16 configured to mold receptacles 2 from precursors 4, and being in particular arranged downstream from pre-heating oven 15 and upstream from filling apparatus 13 along advancement path P.

Alternatively or in addition, article treatment apparatus 1 could also comprise a sterilization apparatus configured to sterilize receptacles 2, and could be in particular arranged upstream of filling apparatus 13 along advancement path P.

In more detail, isolation chamber 4 may comprise an inlet 17 and an outlet 18 designed to allow for respectively feeding and discharging of the articles to and from inner environment 6.

In the specific case shown, inlet 17 is designed to allow for the feeding of precursors 4 into inner environment 6 and outlet 18 is designed to allow for the discharging of filled and capped receptacles 2.

According to a possible embodiment not shown, inlet 17 could be designed to allow for the feeding of (empty) receptacles 2 into inner environment 6 and outlet 18 could be designed to allow for the discharging of filled and capped receptacles 2.

Furthermore, isolation chamber 4 may comprise a plurality of walls 19 delimiting inner environment 6, in particular delimiting inner environment 6 from six faces, and carrying inlet 17 and outlet 18.

In particular, some walls 19 could have (substantially) a horizontal orientation and some walls 19 could have a (substantially) vertical orientation.

In more detail, conveying apparatus 12 may be configured to advance precursors 4 from inlet 17 to an intermediate station and receptacles 2 from the intermediate station to outlet 18.

According to some possible alternative embodiments, conveying apparatus 12 could be designed to advance receptacles 2 from inlet 17 to outlet 18, in particular conveying apparatus 12 could be configured to receive receptacles 2 at inlet 17 and to discharge receptacles 2 at outlet 18. According to such an alternative embodiment, conveying apparatus 12 could be configured to advance receptacles 2 from inlet 17 to filling apparatus 13, from filling apparatus 13 to capping apparatus 14 and from capping apparatus 14 to outlet 18.

In further detail, conveying apparatus 12 may comprise one or more star wheels 20, in the example shown three, and/or one or more conveying carousels 21, each star wheel 20 and each conveying carousel 21 being rotatable around a respective rotation axis A, in particular having a vertical orientation, and each one being configured to advance receptacles 2 along a respective (arc-shaped) portion of advancement path P.

According to some possible non-limiting embodiments, one conveying carousel 21 is associated to filling apparatus 13 and defines (at least partially) filling portion P1 and/or one conveying carousel 21 is associated to capping apparatus 14 and defines (at least partially) capping portion P2 and/or one conveying carousel 21 is associated to molding apparatus 16 and is configured to advance precursors 4 along a respective molding portion P3 of advancement path P and receptacles 2 along a transfer portion P4 of advancement path P.

Moreover, conveying apparatus 12 could also comprise a conveyor 22 for advancing precursors 4 along a pre-heating portion P5 of advancement path P.

According to some preferred non-limiting embodiments, at least one star wheel 20 is arranged upstream of each conveying carousel 21 and at least one star wheel 20 is arranged downstream of each conveying carousel 21 along advancement path P.

In more detail, filling apparatus 13 may comprise a plurality of filling units (not shown and known as such) arranged within inner environment 6 and configured to fill receptacles 2 with the pourable product during advancement of receptacles 2 along filling portion P1.

In particular, the filling units are arranged on the respective conveying carousel 21, in particular the filling units being equally spaced about the respective rotation axis A.

Preferentially, each filling unit comprises a retaining element, such as a gripping element or a pedestal, designed to retain one respective receptacle 2 during advancement along the filling portion P1 and a filling valve designed to selectively direct the pourable product into the respective receptacle 2 during its advancement along filling portion P1.

In further detail, each capping apparatus 14 may comprise a plurality of capping units (known as such) configured to retain receptacles 2 and to apply (and fasten) the closures on receptacles 2 during their advancement along capping portion P2.

Preferentially, the capping units are arranged on the respective conveying carousel 21, and in particular are equally spaced about the respective rotation axis A.

In even further detail, each capping unit may comprise a respective retaining element, such as a gripping element or a pedestal, configured to retain one respective receptacle 2 during advancement along the capping portion P2 and a respective capping head configured to apply and to fasten one respective closure on the respective receptacle 2.

Moreover, each capping apparatus 14 may comprise a feed unit configured to feed closures 3 to the capping units. Additionally, capping apparatus 14 may also comprise a sterilization unit for sterilizing closures 3 and designed to direct sterilized closures 3 to the feed unit.

In more detail, the feed unit may comprise a feed channel 22 (delimiting a portion of inner environment 6) through which closures 3 are fed to the capping units.

Furthermore, molding apparatus 16 may comprise a plurality of molding units 24 arranged within inner environment 6 and configured to mold receptacles 2 from precursors 4 during advancement of precursors 4 along molding portion P3.

In particular, molding units 24 may be arranged on the respective conveying carousel 21, in particular being equally spaced about the respective rotation axis A.

With particular reference to FIGS. 1 to 7, each inspection system 8 comprises at least a separation housing 29 designed to be mounted and/or mounted to isolation chamber 5, in particular a respective wall portion 30 of walls 19, and a camera 31, in particular a digital camera, even more particular a digital video camera.

In particular, each separation housing 29 is designed to protrude and/or protrudes into inner environment 6 and comprises a cavity 32, which is designed to be and/or is fluidically separated from inner environment 6. Even more particular, cavity 32 may be designed to be and/or is in fluidic connection with outer environment 7.

Figure 2:
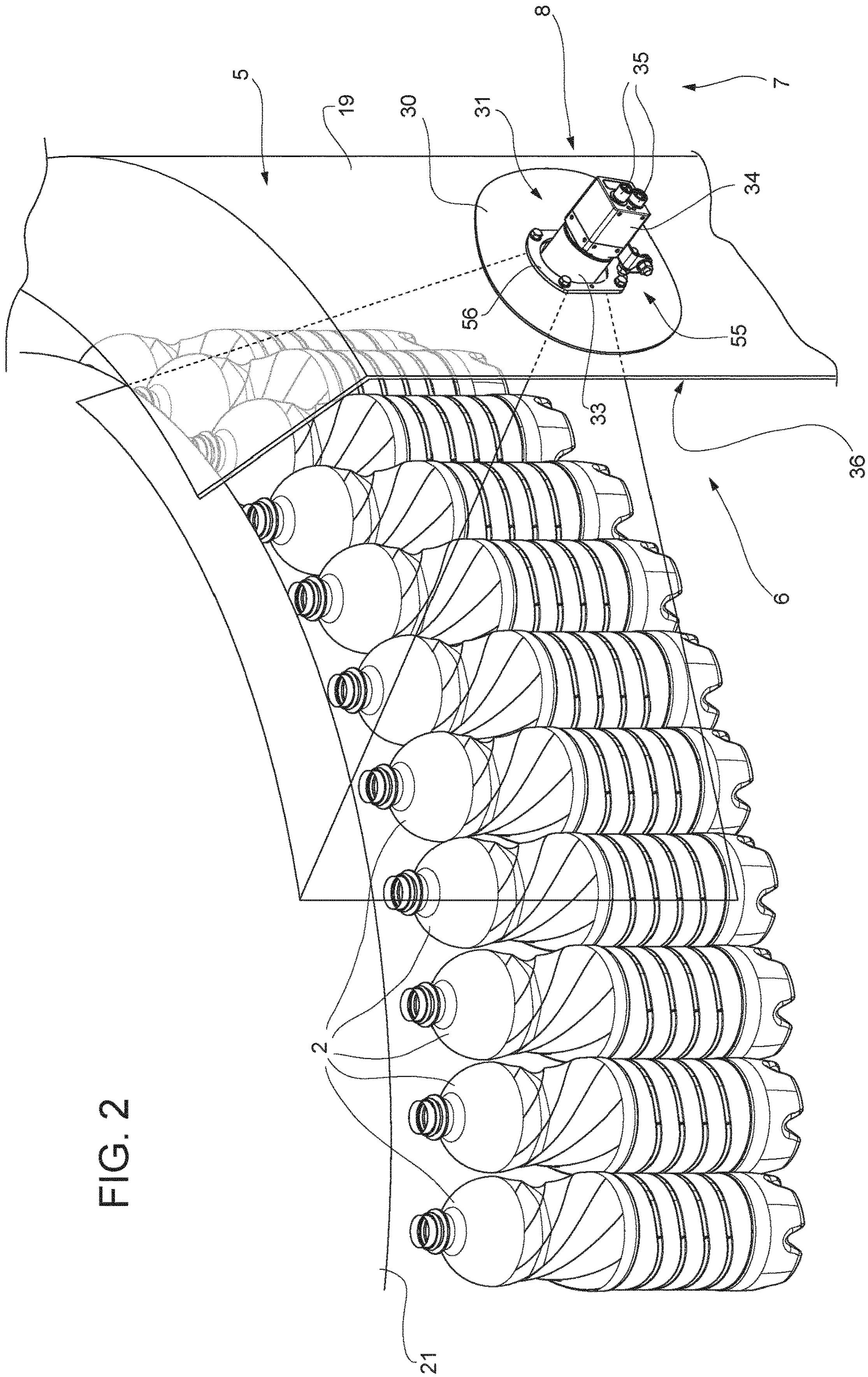
FIG. 2 is a perspective and schematic view of a detail of the article treatment machine of FIG. 1, with parts removed for clarity.
Figure 3:
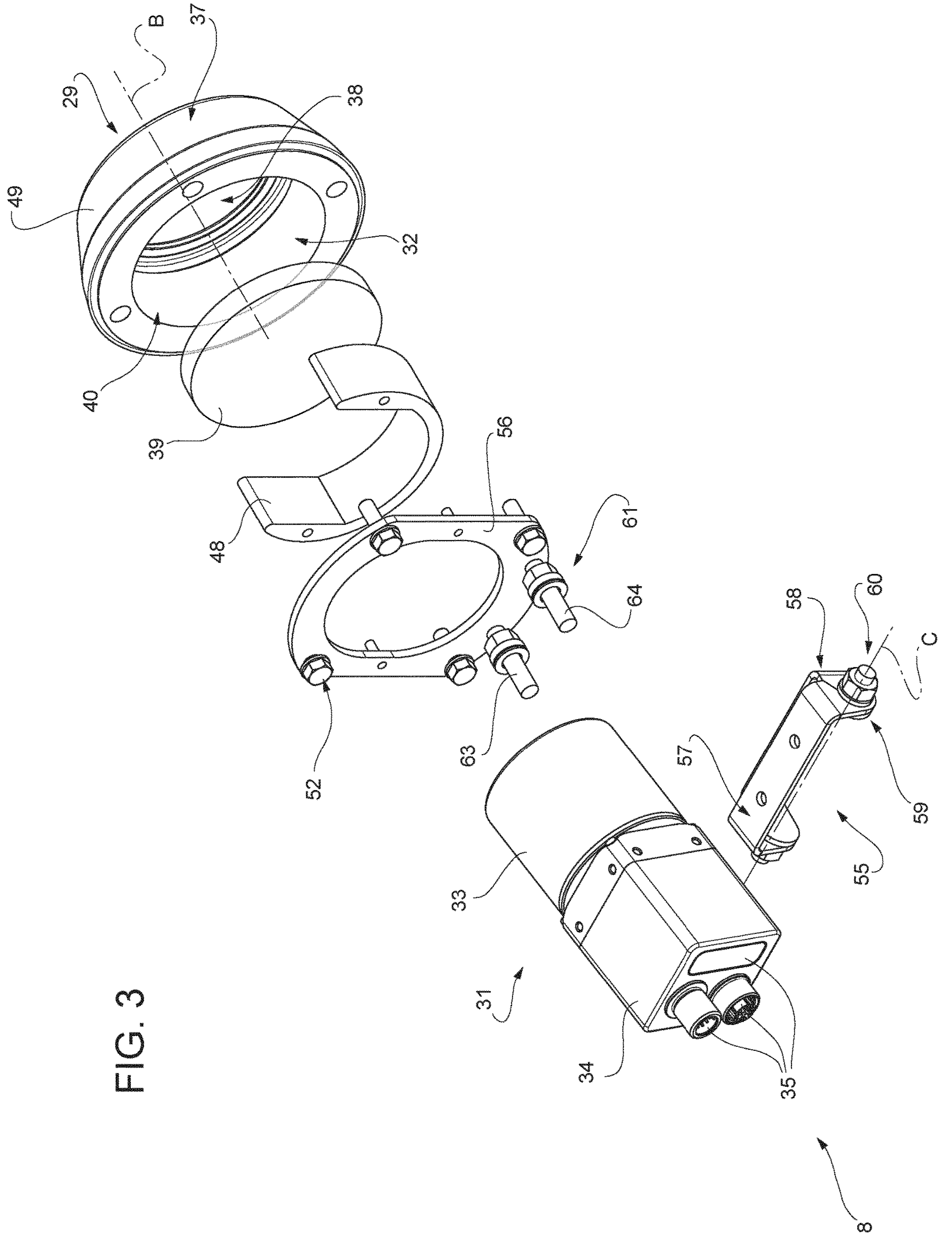
FIG. 3 is an exploded view of the inspection system of the machine according to the present invention, with parts removed for clarity.
Figure 4:
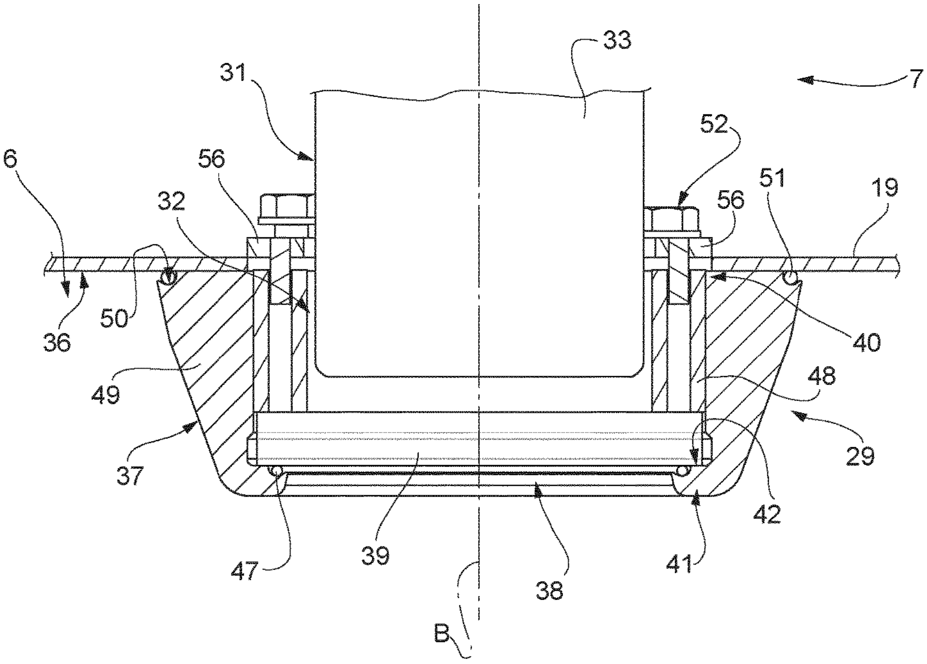
FIGS. 4 and 5 are section views of details of the article treatment machine, with parts removed for clarity.

Advantageously and with particular reference to FIGS. 2 and 4, each camera 31 is at least partially arranged within the respective cavity 32.

In this way the inspection system 8 can be positioned also to inspect narrow spaces or tight spots of the inner environment 6, while having a good field of view of the camera 31 with respect to the area to be inspected or monitored.

In more detail, each camera 31 comprises a lens portion 33 having an optical system, in particular the optical system having at least one lens.

Additionally, each camera 31 may comprise a main portion 34 carrying the respective lens portion 33 and having at least an (electronic) image pick-up device for acquiring images. In particular, the image pick-up device is designed to receive light propagating through the optical system.

Furthermore, each camera 31 may comprise one or more connection interfaces 35 so as to connect camera 31 to external sources such as electrical supplies, computing devices, image editing devices, other electronic devices, etc.

According to some possible non-limiting embodiments, each camera 31 may comprise an image analyzing unit for analyzing the images acquired, in use, by camera 31, in particular the respective image pick up device.

Alternatively or in addition, each camera 31 may be connectable to an external image analyzing unit.

In more detail, at least each lens portion 33 may be partially positioned within the respective cavity 32.

In this way the separating housing 29 can be optimally exploited to improve the field of view of the camera 31 with respect to the area to be monitored or inspected.

In more detail and with particular reference to FIGS. 1, 2, 4 and 5, each separation housing 29 may be designed to be mounted and/or may be mounted to an inner surface 36 of isolation chamber 5, in particular inner surface 36 facing and/or delimiting inner environment 6.

In even more detail, each separation housing 29 may comprise a frame 37, in particular an annular frame 37, having an opening 38 and a transparent wall 39, in particular a transparent glass wall, covering opening 38. In particular, transparent wall 39 may have a circular shape.

In particular, each frame 37 and the respective transparent wall 39 delimit the respective cavity 32 and are designed to fluidically separate and/or fluidically separate cavity 32 from inner environment 6.

Moreover, each camera 31, in particular the respective lens portion 33, even more particular the respective optical system, may be designed to inspect a respective area within inner environment 6 through transparent wall 39.

In more detail, each frame 37 may be designed to protrude and/or may protrude from the respective wall portion 30 and/or inner surface 36 into inner environment 6.

Preferentially, each frame 37 may at least partially delimit, in particular at least laterally delimit, the respective cavity 32.

In further detail, each frame 37 may extend along a (central and/or longitudinal) axis B. Preferentially, each frame 37 has an annular, in particular circular, cross-section with respect to a cross-section plane being perpendicular to axis B.

Preferentially, each frame 37 may comprise a further opening 40 opposed to the respective opening 38 and allowing to at least partially place the respective camera 31 into the respective cavity 32.

Moreover, each frame 37 may carry the respective opening 38 and the respective opening 40 at respectively a first end and a second end of frame 37, the first end and the second end being opposed to one another with respect to axis B.

In more detail, each frame 37 may comprise a rim 41, in particular arranged at the respective first end, delimiting the respective opening 38. In particular, the respective transparent wall 39 abuts against rim 41.

In even more detail, each rim 41 may comprise an abutment surface 42 and the respective transparent wall 39 may engage abutment surface 42.

According to some possible non-limiting embodiments, each rim 41 may comprise an annular groove and an annular gasket 47 arranged within the annular groove. Preferentially, each transparent wall 39 is pressed against the respective gasket 46, in particular for guaranteeing the sealing of the respective cavity 32 from inner environment 6. Preferentially, each gasket 46 comprises and/or defines at least a portion of the respective abutment surface 42.

In this way it is improved the operative compactness of the mechanical configuration of the components required for mounting the camera 31 to the isolation chamber 5, while avoiding the risk of occurring of a contamination of the inner environment 6 due to this mechanical configuration and/or the risk of damaging the camera 31 by some material present within the inner environment 6.

Preferentially, each separation housing 29 comprises a spacer 48 designed to be arranged and/or being arranged between the respective transparent wall 39 and the respective wall portion 30. In particular, each spacer 48 is designed to exert and/or exerts a pressing force onto the respective transparent wall 39, in particular so as to press the respective transparent wall 39 against the respective rim 41, in particular against at least the respective gasket 47.

In particular, each spacer 48 may have an arc-shaped profile.

In more detail, each spacer 48 may contact the transparent wall 39 from a first terminal end and the respective wall portion from a second terminal end opposed to the first terminal end.

The use of the spacer 48 interposed between the transparent wall 39 and the wall portion allows to minimize the number of mechanical component for mounting the camera 31 to the isolation chamber 5.

Figure 5:
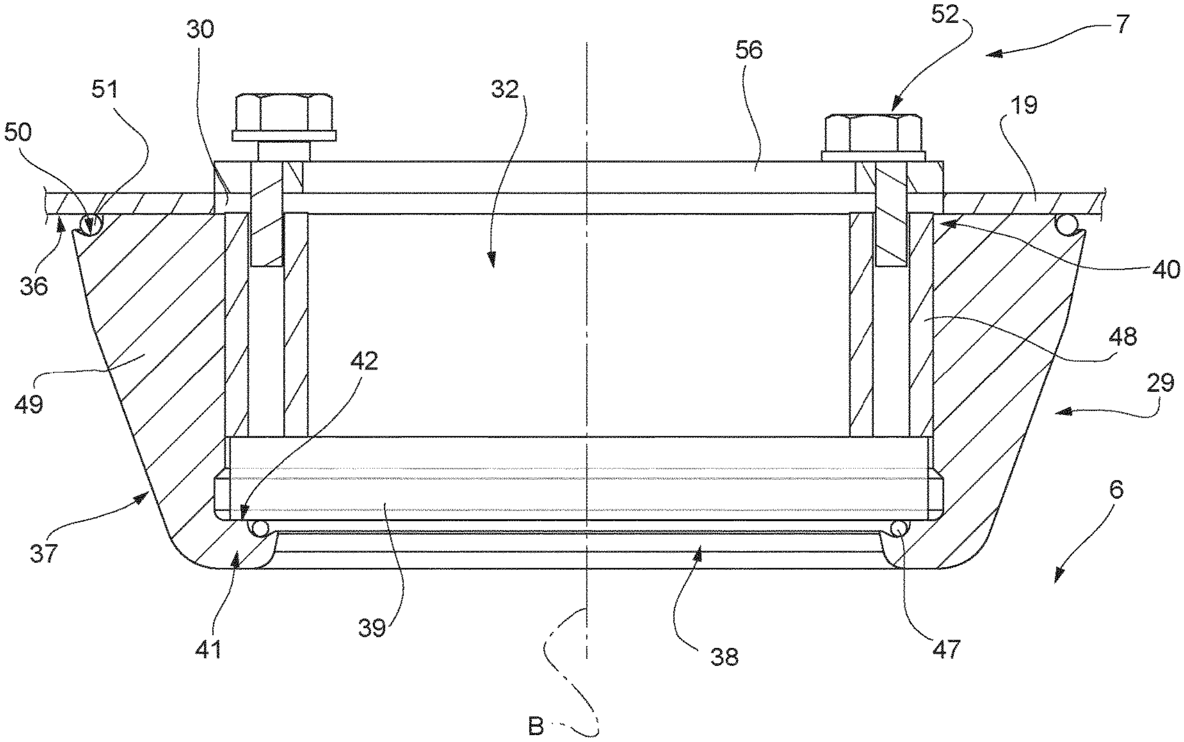
Figure 6:
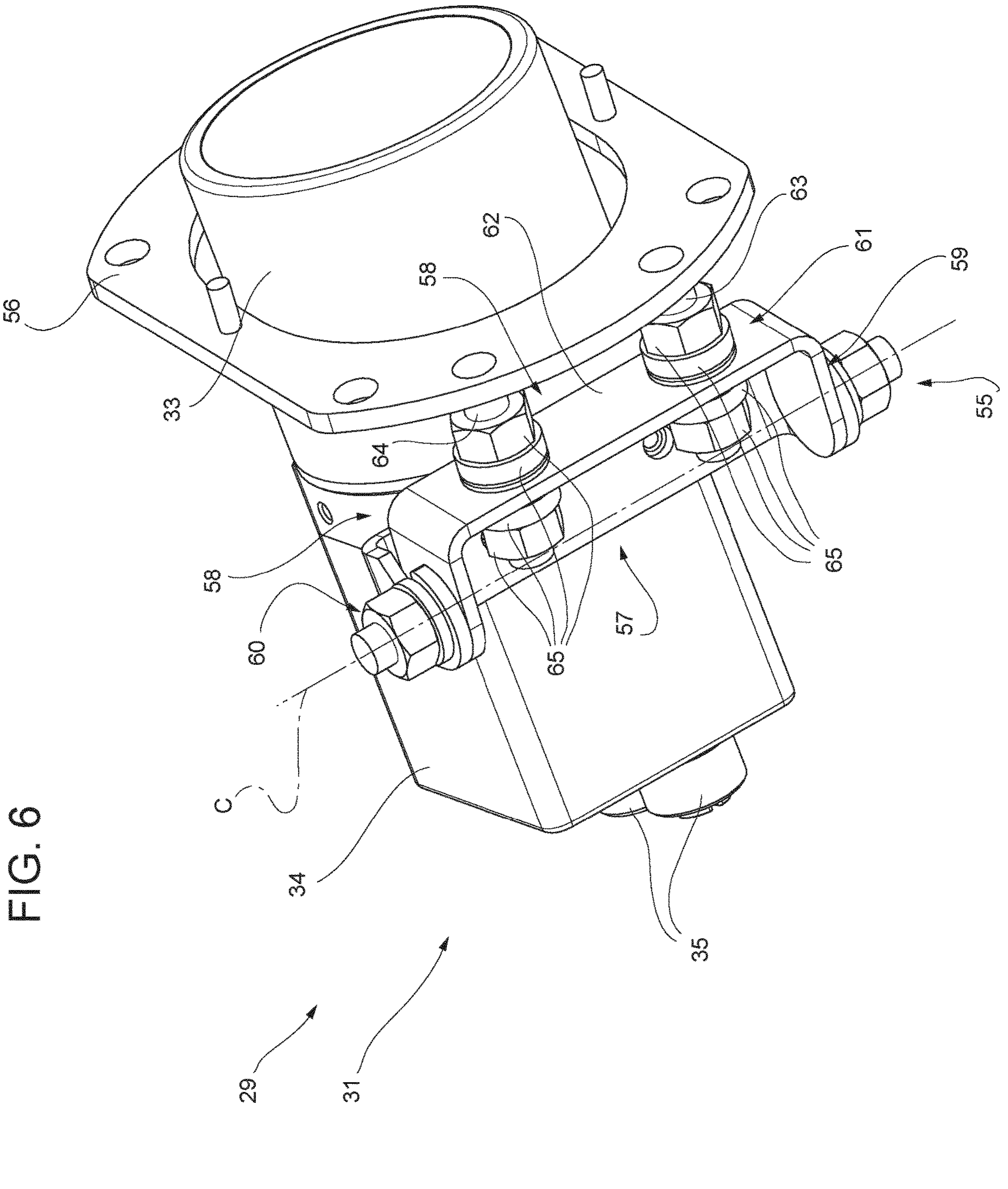
FIG. 6 is a perspective view of the inspection system, with parts removed for clarity.
Figure 7:
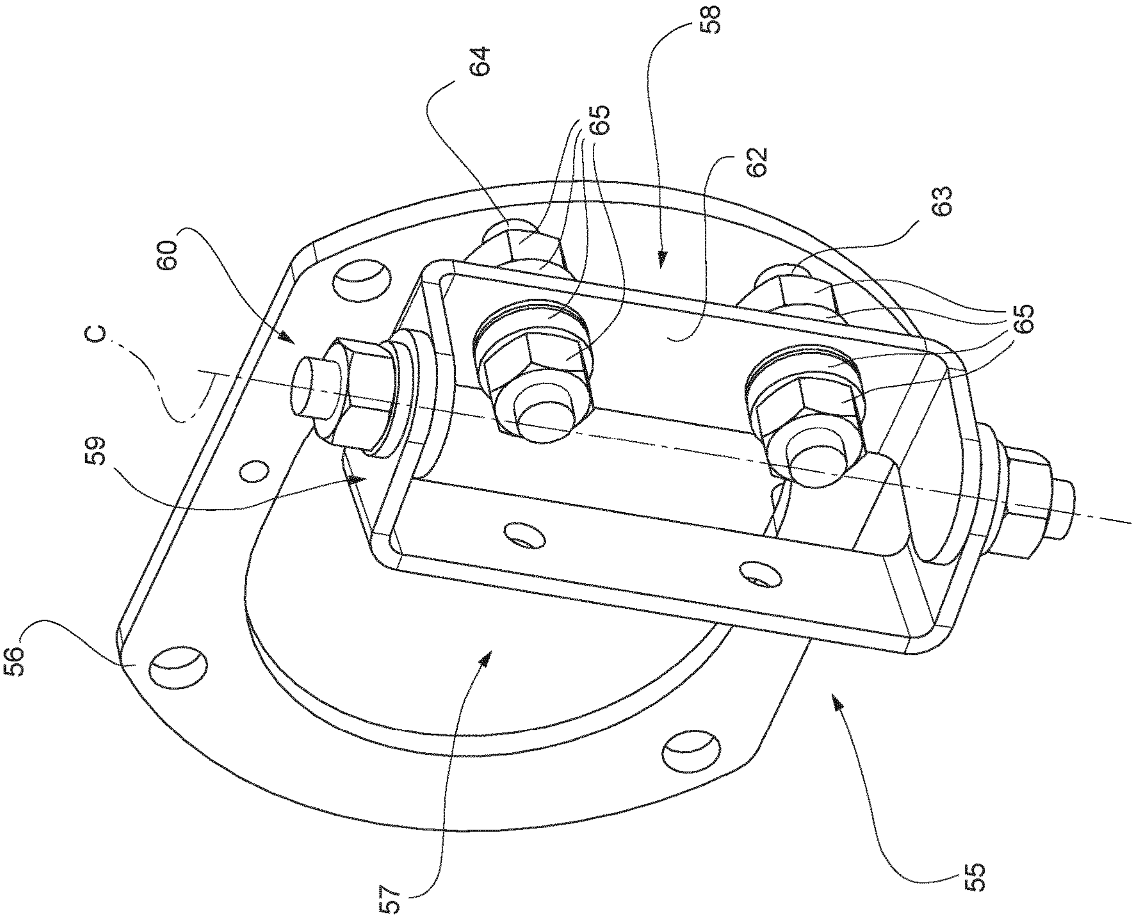
FIG. 7 is a perspective view of a control device of the inspection system.

With particular reference to FIGS. 4 and 5, each frame 37 may comprise a side wall 49 carrying the respective rim 41 (at a first end of side wall 49), in particular the respective rim 41 may radially protrude inwards from the respective side wall 49.

Moreover, side wall 49 delimits the respective opening 40 at a second end of side wall 49 opposed to the respective first end.

According to some preferred non-limiting embodiments, each frame 37, in particular the respective side wall 49, may comprise an annular groove 50 and an annular gasket 51 designed to contact and/or contacting the respective wall portion 30. In particular, each gasket 51 seals the respective cavity 32 from inner environment 6 (in particular at the interface between the respective frame 37 and the respective wall portion 30).

According to some preferred non-limiting embodiments, each inspection system 8 also comprises a first fixing device 52 designed to fix the respective separation housing 29 to isolation chamber 5, in particular to the respective wall portion 30.

With particular reference to FIGS. 2, 3, 6 and 7, each inspection system 8 may comprise a control device 55 coupled to the respective camera 31 and configured to control the position and/or orientation of the respective camera 31. In particular, by means of control device 55 it is possible to define and/or modify the area within inner environment 6, which, in use, may be inspected by camera 31.

Preferentially, each control device 55 is configured to control the position and/or orientation of the respective camera 31 in three dimensions.

According to some preferred non-limiting embodiments, each control device 55 is also configured to support the respective camera 31.

Moreover, control device 55 may be connected and/or coupled to the respective wall portion 30, in particular by means of a coupling plate 56 of the respective inspection system 8.

In more detail, each control device 55 comprises a first support portion 57 connected to the respective camera 31, in particular the respective main portion 34, and a second support portion 58 directly or indirectly (by means of the respective coupling plate 56) coupled to the respective wall portion 30.

Preferentially, each first support portion 57 is moveably, in particular angularly moveable around a rotation axis C, coupled to the respective second support portion 58.

Moreover, each control device 55 may comprise a respective coupling group 59 partially associated to the respective first support portion 57 and partially associated to the respective second support portion 58 and moveably coupling the respective first support portion 57 and the respective second support portion 58 to one another. In particular, coupling group 59 defines the respective rotation axis C.

Even more preferentially, each control device 55 comprises locking unit 60 designed to lock and unlock the respective first support portion 57 for respectively impeding and allowing movement of the respective first support portion 57 with respect to the respective second support portion 58.

In more detail, each control device 55, in particular each second support portion 58, may comprise a position control group 61 designed to control a relative position of second support portion 58 with respect to the respective wall portion 30 (and the respective coupling plate 56).

In even more detail, each position control group 61 may be operatively connected to a main plate 62 of the respective second support portion 58, and in particular being designed to modify the position of main plate 62 with respect to the respective wall portion 30 (and the respective coupling plate 56). It should be noted that any modification of the position of main plate 62 results in a modification of the position of the respective first support portion 57.

According to some possible non-limiting embodiments, each position control group 61 may comprise a first bar 63 and a second bar 64 spaced apart from one another and each one being connected to one respective portion of the respective main plate 62, in particular each one penetrating through a respective hole of the respective main plate 62.

Moreover, each first bar 63 and each second bar 64 is designed to contact and/or contacts a respective section of the respective wall portion 30 and/or the respective coupling plate 56.

Preferentially, each of the first bar 63 and second bar 64 is designed to allow for modification of the position of the respective portion of the main plate 62, in particular with respect to the respective wall portion 30 and/or the respective coupling plate 56. In particular, each of the first bar 63 and second bar 64 may allow for movement of the respective portion of the main plate 62 along the relative first bar 63 or the relative second bar 64.

Even more preferentially, each position control group 61 may also comprise a plurality of locking elements 65 for locking the position of the respective portion of the main plate 62.

This position control group 61 allows a very accurate adjustment of the position of the camera 31 with respect to the wall portion 30.

In use, article treatment apparatus 1 treats articles within inner environment 6 and inspection systems 8 inspect respective areas within inner environment 6.

According to the specific embodiment disclosed, article treatment apparatus 1 fills at least receptacles 2 with the pourable product by means of filling apparatus 13 and applies and fastens closures 3 onto receptacles 2 by means of capping apparatus 14 during advancement of receptacles 2 along respectively the filling portion P1 and the capping portion P2.

Additionally, article treatment apparatus 1 may also preheat precursors 4 by means of pre-heating apparatus 15 and/or to mold receptacles 2 from precursors 4 by means of molding apparatus 16.

Preferentially, the orientation and/or position of each camera 31 may be controlled by means of control device 55 prior and/or during operation of article treatment machine 1.

The configuration of the control device 55 offers a wide range of adjustment for adjusting the orientation and/or position of the camera 31 while optimizing the compactness.

The advantages of article treatment machine 1 according to the present invention will be clear from the foregoing description.

In particular, by having separation housing 29 protruding into inner environment 6 and by at least partially placing camera 31 within cavity 32, it is possible to visually inspect also difficult to access areas within inner environment 6.

Another advantage resides in the possibility to remove sensors, which e.g. may be associated to the filling unit, as e.g. the filling process becomes observable by means of camera 31, which previously required the use of specific sensors.

An even other advantage is seen in that the visual inspection can be done during operation of article treatment machine 1.

A further advantage resides in the possibility to move and orient camera 31 within cavity 32 so as to control the area to be observed within inner environment 6.

Clearly, changes may be made to inspection system 8 and/or article treatment machine 1 as described herein without, however, departing from the scope of protection as defined in the accompanying claims.

The invention claimed is:

1. An article treatment machine for packaging of pourable food products comprising at least:

- an isolation chamber defined by walls that separate and seal an inner environment, from an outer environment, the inner environment being sterile or aseptic and maintained under controlled conditions;
- one or more treatment apparatuses configured to treat one or more articles within the inner environment; and
- at least one inspection system which is mounted to a wall portion of the isolation chamber;

wherein:

- the at least one inspection system comprises at least a separation housing designed to be mounted to an inner surface of the isolation chamber and to protrude into the inner environment;
- the separation housing comprises a cavity within the separation housing fluidically separated from the inner environment;
- the at least one inspection system further comprises a camera at least partially arranged within the cavity and configured to inspect the inner environment through a transparent wall;
- wherein the separation housing protrudes into the inner environment, and wherein at least a portion of the at least one inspection system, other than the separation housing, protrudes outwardly into the outer environment.

2. The article treatment machine according to claim 1, wherein the camera comprises a lens portion having an optical system and is partially arranged within the cavity.

3. The article treatment machine according to claim 1, wherein the separation housing comprises:

- a frame having an opening; and
- a transparent wall, covering the opening;
- wherein the camera is placed within the cavity to inspect an area within the inner environment through the transparent wall.

4. The article treatment machine according to claim 3, wherein the frame comprises a rim delimiting the opening; and

- wherein the rim comprises an abutment surface and the transparent wall engages the abutment surface.

5. The article treatment machine according to claim 4, wherein the rim comprises a groove and a gasket arranged within the groove; and

- wherein the transparent wall is pressed against the gasket.

6. The article treatment machine according to claim 4, wherein the separation housing comprises a spacer designed to be arranged between the transparent wall and a wall portion of the isolation chamber; and wherein the spacer exerts a pressing force onto the transparent wall and a wall portion of the isolation chamber; and wherein the spacer exerts a pressing force onto the transparent wall.

7. The article treatment machine according to claim 1, further comprising a control device coupled to the camera and configured to selectively control the position and orientation of the camera relative to the separation housing in three dimensions.

8. The article treatment machine according to claim 7, wherein the control device comprises a first support portion connected to the camera and a second support portion coupled to a respective wall portion of the isolation chamber; and

- wherein the first support portion is rotatable with respect to the second support portion.

* * * * *